C. M. ANGELL.
ACCUMULATOR CELL HANDLE.
APPLICATION FILED SEPT. 24, 1918.
1,362,832.
Patented Dec. 21, 1920.
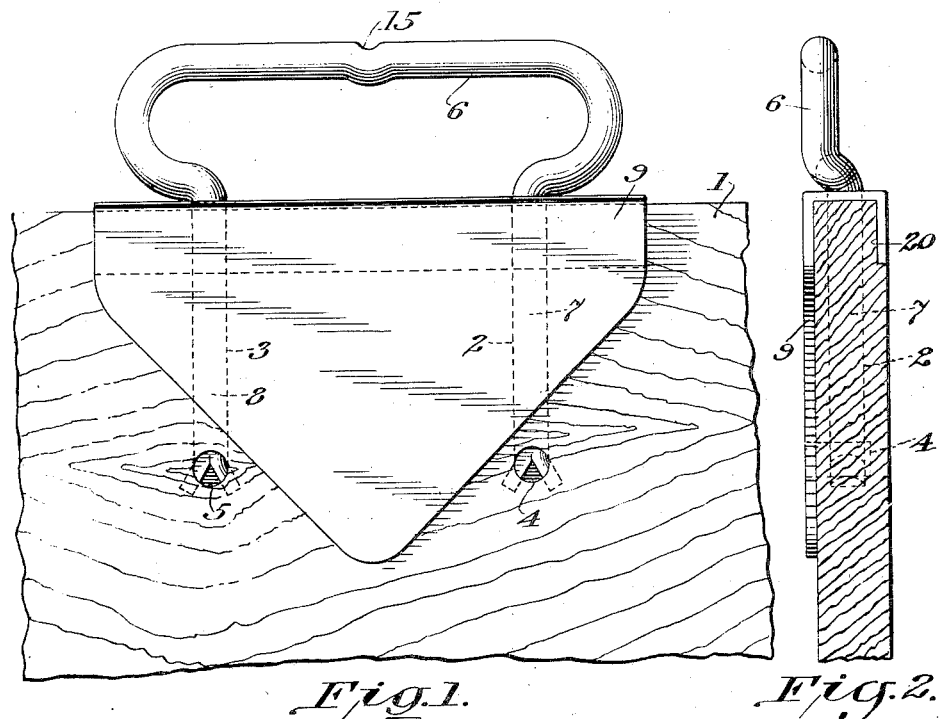
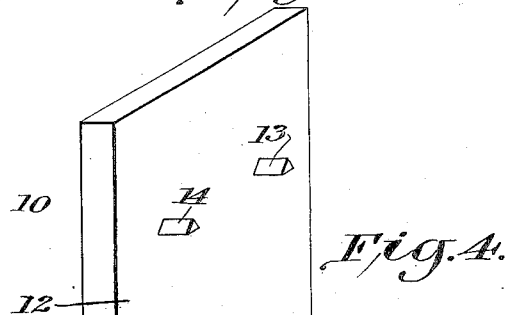
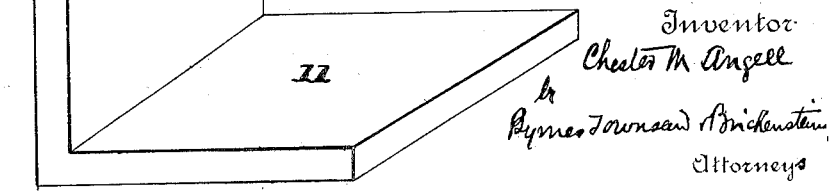

C. M. ANGELL.
ACCUMULATOR CELL HANDLE.
APPLICATION FILED SEPT. 24, 1918.
1,362,832.
Patented Dec. 21, 1920.
2 SHEETS—SHEET 2.
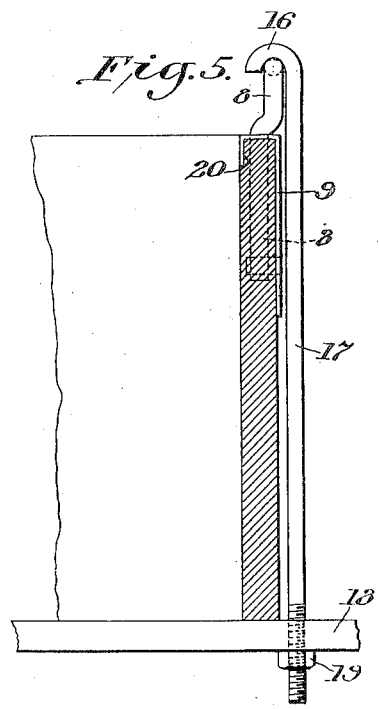
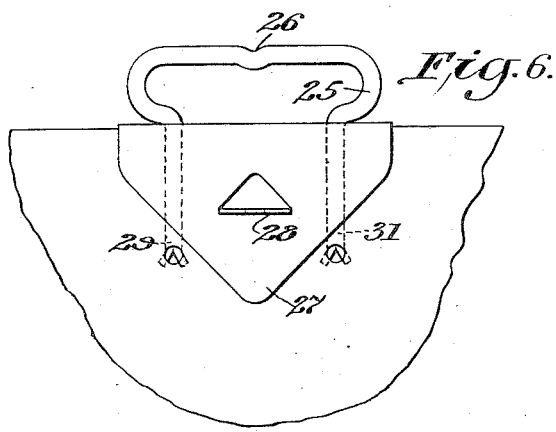
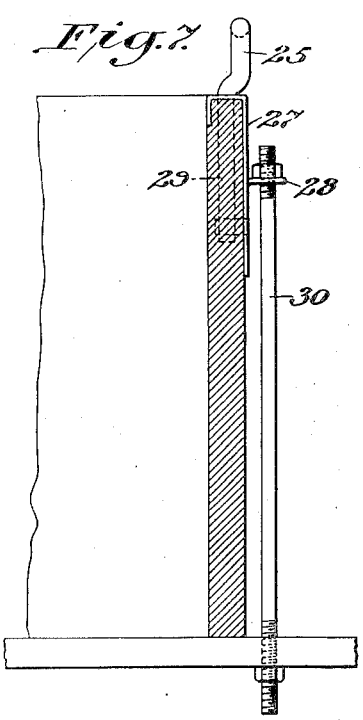
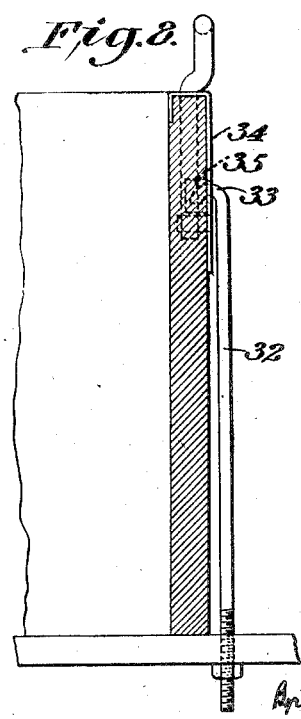
Inventor
Chester M. Angell

UNITED STATES PATENT OFFICE.

CHESTER M. ANGELL, OF CHICAGO, ILLINOIS, ASSIGNOR TO VESTA ACCUMULATOR COMPANY, OF CHICAGO, ILLINOIS, A CORPORATION OF ILLINOIS.

ACCUMULATOR-CELL HANDLE.

1,362,832.  Specification of Letters Patent.  Patented Dec. 21, 1920.

Application filed September 24, 1918. Serial No. 255,500.

*To all whom it may concern:*

Be it known that I, CHESTER M. ANGELL, a citizen of the United States, residing at Chicago, in the county of Cook and State of Illinois, have invented certain new and useful Improvements in Accumulator-Cell Handles, of which the following is a specification.

This invention relates to accumulator cells and more particularly to accumulator cells used in connection with vehicles or other moving bodies.

It is well known that accumulator cells used on automobiles are subjected to severe jars and jolts and all sorts of vibrations in general. It is therefore a difficult problem to so mount the battery cell as to reduce the wear to a reasonable minimum and prevent relative movement between the battery and the body of the automobile.

It is an object of this invention to provide means whereby the vibrations, jolts or jars communicated from the automobile through the holding or securing means to the body of the battery case are distributed over a relatively large surface of the case and a concentration or localization of forces acting on the case is as much as possible avoided.

Another object is to provide a handle construction which is simple and strong and so attached to the battery casing that the wood of the casing will be protected against the action of acid.

For a fuller understanding of the invention reference is had to the appended drawings, in which—

Figure 1 is a fragmentary elevational view of an accumulator cell embodying the invention;

Fig. 2 is an end view thereof;

Fig. 3 is a top view of the device shown in Figs. 1 and 2;

Fig. 4 is a perspective view of a tool used in connection with the invention;

Fig. 5 is a view similar to Fig. 2 showing the application of the invention in practice;

Fig. 6 is a view similar to Fig. 1 showing a modification;

Fig. 7 is an end view thereof; and

Fig. 8 is an end view showing a modification of the form shown in Figs. 6 and 7.

In the drawings in which like numerals refer to like parts, 1 represents a wall of the casing of an accumulator cell. This wall is provided with bores 2 and 3 extending downwardly between the inner and outer surface thereof and with bores 4 and 5 extending from the outer surface of the wall to the lower end of the bores 2 and 3. A handle portion 6 is provided with shanks 7 and 8 split at their free ends and extending into the bores so that the split ends are accessible from without through the bores 4 and 5.

To lock the shanks in place I preferably use a tool 10 such as shown in Fig. 4. This tool consists of a base member 11 and an upright wall 12 on which are mounted wedge elements 13 and 14 projecting from the side thereof. The box or cell casing is placed on the base 11 so that the wedge members 13 and 14 extend into the bores 4 and 5 respectively. Then the shanks 7 and 8 are pushed down the bores 2 and 3 and when the splits of the shanks are properly positioned over the wedge elements 13 and 14 a few taps with a suitable tool will force the split ends apart into the surrounding material of the casing.

If it is desired to avoid all risk of injuring the body of the casing, the bores 4 and 5 may be correspondingly enlarged.

It is to be noted that in this manner substantially the whole force of the blows necessary to expand the shanks is taken up by the wedge elements and a strong handle may be rigidly attached to the relatively thin cell casing. The shanks are made relatively long, which eliminates pivotal movement and thereby reduces the wear to practically nothing.

In the top portion of the handle is formed a depression 15 (see Fig. 1) to form a seat for the hook portion 16 of a tie rod 17 shown in detail in Fig. 5. The lower portion of this rod 17 extends through an opening in the support 18 which may be any part of the body of the automobile adapted to carry the battery and is secured by a nut 19 or in any other suitable manner. In practice the nut is turned up tight until the cell is held rigidly to its support and is then locked in place in any convenient way. It is understood that a second handle is attached in the same way to the opposite side of the battery case.

In order to bring about a division and distribution of the forces acting on the cell case through rod 17, I propose to use a plate 9 consisting of an extended U-shaped portion embracing the upper edge of the casing and a relatively large portion contacting with the outer wall of the casing. That part of the U-shaped portion which contacts with the inner surface of the wall of the casing is set into a recess 20 so that the exposed face thereof is flush therewith as clearly shown in Fig. 2. The lower part of the handle portion rests on the uppermost part of the plate 9.

In practice the plate 9 is so formed that it has considerable frictional contact with the sides of the casing. It is thus obvious that the vibrations transmitted through the rod 17 to the upper part of the handle 6 are distributed over a relatively very large surface, and the effects reduced in proportion. Play between the cell casing and the body of the automobile with the usual consequences is practically eliminated.

In Figs. 6 and 7 is shown a modified form in which the tie rod may be connected to the handle 25 having a depression 26 for that purpose or to the plate 27 directly. The plate 27 has a portion 28 stamped out and bent to form an ear which may be perforated to receive the upper part of the tie rod 30. In this case the plate 27 transmits the downward pressure over a considerable surface of the casing while the spread ends of the shanks 29 and 31 take the upward strain in carrying the battery.

Fig. 8 shows a form similar to that shown in Figs. 6 and 7. The tie rod 32, however, has a hook portion 33 which is received in an opening in the plate 34, part of the material of the cell casing being removed to form a recess 35 indicated in dotted lines to accommodate the inwardly projecting end of the hook portion 33.

It is understood that various changes may be made within the scope of the preceding disclosure.

I claim:

1. A device for securing an accumulator battery to its support upon a motor vehicle, comprising a plate formed to frictionally engage a relatively large portion of a wall of the battery casing and to embrace the upper edge thereof and means for making connection with the plate at a point remote from said edge for securing the casing to the support.

2. A device for securing an accumulator battery to its support upon a motor vehicle, comprising a plate formed to embrace the greater part of the upper edge of a wall of the casing and frictionally engage a relatively large portion of the outer surface thereof and means for making connection with the plate at a point remote from the said edge for securing the casing to the support.

3. An attachment for a battery casing comprising a handle having relatively long shanks adapted to be received and locked in substantially vertical bores in a side of the battery casing and a plate formed to frictionally embrace the upper edge of the side of the casing, said plate having perforations to receive the said shanks.

4. The combination of a battery casing, substantially vertical bores in a side of the casing, a handle having shanks to be received and locked in said bores, a plate formed to frictionally embrace the upper edge of the said side and having perforations in alinement with said bores and means engaging the plate at a point remote from the upper edge of the side of the casing for securing the casing to a support.

5. A device for securing an accumulator battery to its support upon a motor vehicle, comprising a plate formed to embrace the greater part of the upper edge of a wall of the casing and frictionally engage a relatively large portion of the outer surface thereof, means on the plate defining a lug intermediate the said edge and the lower edge of the plate and means for making connection with the said lug for securing the casing to the support.

6. An attachment for a battery casing for securing it to its support upon a motor vehicle, comprising a plate formed to embrace the upper edge of a wall of the casing and frictionally engage a relatively large portion of the outer surface thereof, said plate having perforations in the edge-embracing portion to receive the shanks of a handle portion and a lug below the said edge and means for engaging the lug and the support to secure the casing to the support.

7. An attachment for a battery casing comprising a handle having shanks adapted to be received and locked in vertical bores in a side of the battery casing and a plate formed to frictionally embrace the upper edge of the side of the casing and to extend downwardly along the outer surface of the said side in substantially co-extensive relation with the said bores and said shanks, the said plate having perforations in alinement with the said bores.

8. An attachment for a battery casing comprising a handle having shanks adapted to be received and locked in vertical bores in a side of the battery casing and a rigid acid resisting element frictionally embracing the upper edge of the said side and having perforations in alinement with the said bores.

9. The combination of a battery casing having vertical bores in a side thereof, a handle having shanks passing through said bores and a plate formed to embrace the upper edge of said side and having perforations in alinement with said bores and means on the plate remote from its upper edge for securing the casing to a support.

In testimony whereof I affix my signature.

CHESTER M. ANGELL.